June 6, 1950 — A. BUCHI — 2,510,549
JOURNAL BEARING
Filed Jan. 20, 1947
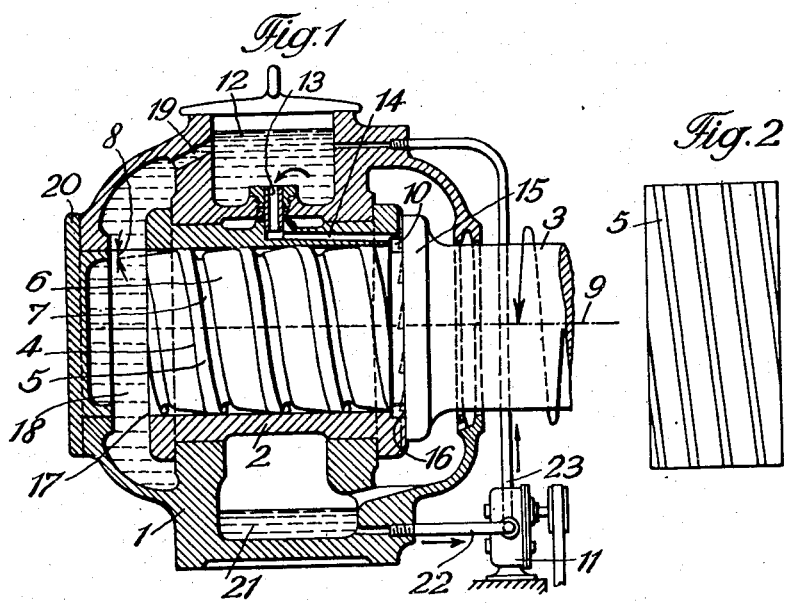
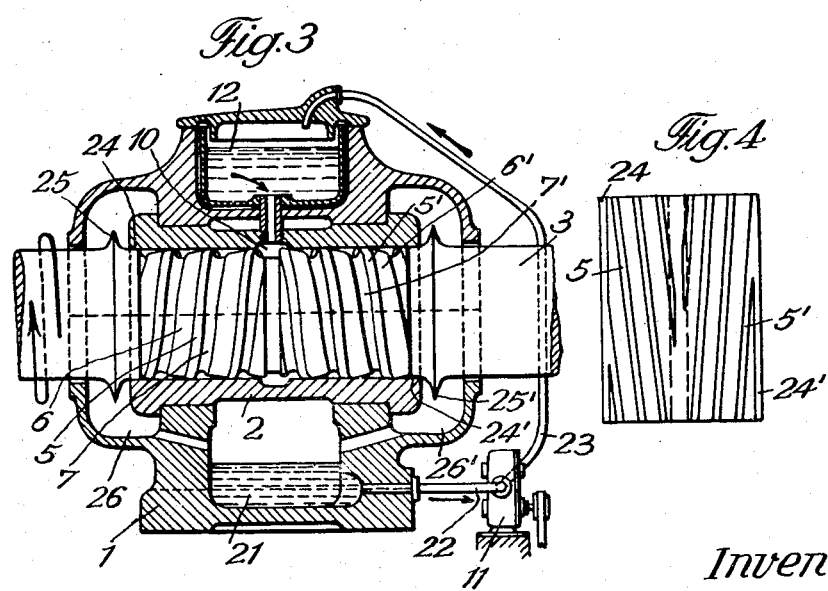
Inventor,
Alfred Buchi
by Sommers-Young,
Attorneys Patented June 6, 1950

2,510,549

UNITED STATES PATENT OFFICE 2,510,549

JOURNAL BEARING

Alfred Buchi, Winterthur, Switzerland

Application January 20, 1947, Serial No. 723,079
In Switzerland January 28, 1942

Section 1, Public Law 690, August 8, 1946
Patent expires January 28, 1962

4 Claims. (Cl. 308—122)

This invention relates to journal bearings and has for an object to provide a bearing which is adapted for operation at extremely high speeds, for example, in small turbines or elastic fluid operated turbo-blowers which may operate at speeds of the order of 5000 to 30,000 R. P. M. or even higher.

This application is a continuation in part of application Serial No. 476,808, filed February 23, 1943, now abandoned.

The main object of my invention is to provide a bearing surface on the rotating part which serves upon rotation to force lubricant between the effective bearing surface and the counterbearing surface, or bushing, of the stationary part. By this means a film of oil at high pressure moving relative to the counterbearing surface is produced between the effective bearing surface and the countersurface of the stationary bushing within which the former rotates. To accomplish the desired result, it is necessary that certain elements constituting the bearing shall have definite relationships to each other. In the construction of a bearing for the purpose in question, the width of the helical bearing surfaces should, preferably, be only wide enough to provide sufficient surface area to carry the maximum load which might be placed on it in operation without breaking through the oil film that must continuously be present between said helical surfaces and the bearing countersurfaces. This immediately raises the question as to what pressure must be present in the oil film, which, in turn, is dependent on other factors, such as the pitch of the helical bearing surface, the taper of the recessed portions, as well as the speed of operation; and also what supplemental pressure if any is furnished from other sources. In properly arranging and proportioning the various elements above mentioned, the forces involved in operation must be taken into consideration, particularly the vibratory forces arising during critical harmonic speeds of rotation due to unavoidable small unbalance in the rotating parts. The oil pressure which must be present between the counterbearing surfaces may thus require to be as high as 150 to 300 lbs. per square inch. However, in proportioning these elements it is required that the width of the helical bearing surfaces shall not be so wide as to cause excessive pumping work to be expended in forcing the oil to flow between the countersurfaces which would excessively reduce the efficiency of the apparatus.

The helically convoluted surface of the rotating bearing part may be so formed as to be adapted to receive the oil at one end of the bearing and convey it to the other end of the bearing, or else, in case the oil is fed to the middle part, to convey it toward both ends of the bearing. The conveyance of the lubricating oil may be effected exclusively by action of the appropriately formed helical configuration of the rotating bearing part or, for supplementing the conveyance and pressure of the lubricating oil, at least one extra lubricating oil pump may be provided.

With a view to obtaining an increased lubricating oil pressure above that at which the oil is supplied to the bearing at the entrance and/or exit ends of the latter, throttling means may be arranged for throttling the lubricating oil.

In the accompanying drawings two embodiments of the invention are illustrated by way of example only, in which Figs. 1 and 2 each represent a view of an embodiment of the invention in the form of a journal bearing with a unidirectional flow of the lubricating oil; and Figs. 3 and 4 each represent a similar view, however, with the oil flowing in opposite directions.

Like numerals denote similar parts in all the figures.

Fig. 1 shows a stationary bearing body 1 including a two-part bearing bushing 2. The numeral 3 designates the shaft mounted in the bearing and 4 represents the bearing surface, while numerals 5, 6, 7 designate features of the configurations of the bearing shaft in accordance with the invention. These configurations consist in a helically convoluted effective bearing surface 5 having a width, measured axially of the bearing, of the order of not more than one-eleventh of the diameter of the bearing shaft, and a conical surface portion 6 decreasing continually in diameter away from the bearing surface 5, and also, for the purpose of facilitating the trimming of said surfaces, these conical portions end in groove-like depressions 7 also of helical shape. The combined width of the groove-like depressions and tapering portion between adjacent bearing surfaces may be about three times the width of the bearing surfaces, and thus the pitch of the helical bearing portions and intermediate depressions is considerably less than the diameter of the shaft. The angle 8 between the conical helical surfaces 6 and the axis 9 of the bearing is chosen to be so small as to define away from the grooves 7 a circumferential tapering space of such small taper and size that by rotation of the shaft oil pressures are set up on the effective bearing portions 5 that are much greater than those existing in the supply of lubricating oil, at 10. The oil pressure may, for example, be of the order of 150 to 300 lbs. per square inch. It should be noted that in operation the effective angle building up pressure on the bearing surfaces 5 is not the angle 8, but a smaller angle resulting from foreshortening of angle 8 in the direction of turning, that is, peripherally of the shaft.

The lubricating oil for the bearing is conveyed by action of a pump 11 to a space 12 where the oil enters and whence it passes through passages 13, 14 to the inner side 16 of a collar 15 on the shaft. This bearing face 16 of the collar 15 may be configurated in any suitable manner. From the radially inner end of the bearing face 16 the lubricating oil passes into the helical recesses 6, 7 and is then forced in between the effective journal bearing portions 5 and the bearing bushing 2 by effect of the rotation of the shaft. Furthermore, axial movement is imparted to the lubricating oil by action of the helical shape of the recesses 6, 7 so that the oil is conveyed toward the exit end 17 of the bearing, for example, toward a space 18. From there the oil is transferred through passages 19 into the oil collecting space 12. The space 18 is closed by a cover 20. Only the amount of oil discharging at the collar 15 flows into a lower collecting space 21 wherefrom it is returned into the collecting space 12 through a conduit 22 by action of the pump 11 after having been drawn in by the latter.

In Fig. 2 the effective bearing portions 5 are shown in developed shape compared with Fig. 1. From this figure it will be seen that the effective bearing surface portions are very narrow relative to the diameter of the shaft 3 and the effective length of the bearing.

Fig. 3 represents a bearing in which the lubricating oil is supplied to a point 10 approximately in the middle of the bearing. The helical form and relative proportions of the effective bearing portions 5 and 5' and that of the conical recesses 6 and 6' as well as that of the grooves 7 and 7' on the journal is, however, such that in contrast to the showing of Fig. 1 the conveyance of the oil is directed from the middle of the bearing toward both ends of the bushing 2. Consequently, the helical convolutions have the effect of conveying in different directions.

Accordingly, the directions in which the helical bearing surface portions 5 and 5' extend are opposite. The same applies to the conical surface portions 6 and 6' and to the groove-like depressions 7 and 7'. Apart from this, at the ends of the bearing surfaces throttling means 24, 24' are arranged, that is, the clearance provided thereat between the journal 3 and the bushing 2 is relatively small. At both ends of the bearing oil splash rings 25, 25' are arranged on the shaft 3. From the spaces 26, 26' the oil flows to the collecting space 21 and thence through conduit 22 to the pump 11. This pump then returns the oil back into collecting space 12 through conduit 23.

In Fig. 4 the effective bearing portions 5, 5' are shown as developed along their circumference together with bearing portions 24, 24' which are intended to function as throttling means for the oil at the ends of the bearing bushing 12, for the purpose of raising the pressure in the bearing above that existing in the supply conduit 10 for the oil.

The invention can be modified in many various ways. The invention can be applied also to bearings in which the rotating bearing part is mounted on a stationary bearing pin or the like and carries the convoluted bearing surface interiorly thereof, contrary to the species illustratively exemplified. By the means suggested by the invention, the advantage is obtained that between the relatively narrow helical rotating bearing part and the stationary effective bearing countersurface, pressure oil is introduced which moves in the axial direction. The effect of the pressure of this oil spreads to the whole circumference of the bearing and thus not solely to a small portion of the load-carrying bearing assembly, such as, for example, the lower or upper bearing part of journal bearings of plain construction. Shafts mounted in bearing assemblies according to the invention will therefore run more smoothly. Moreover, such bearing assemblies have inherently the effect of conveying the oil so that circulation of oil is automatically obtained. Again various portions of the bearing bushings are successively subjected to the load of the rotating part, namely, those parts which have been flushed with oil immediately preceding the application of load and which thus have just been appropriately cooled.

The invention is intended to be useful particularly in connection with steam and gas turbines and the like for assuring appropriate cooling, small frictional impairment, and thus a smooth, noiseless running of hot high-speed shafts.

I claim:

1. In a journal bearing adapted to be lubricated, a stationary part and a rotating part adapted to rotate at high speeds and having a bearing surface cooperating with a coaxial countersurface on said stationary part, said rotating bearing surface comprising a cylindrically defined helically convoluted effective bearing portion extending at least one full circumference of the rotating part, a slightly conical surface portion defining one edge of said bearing portion and decreasing in radius continuously in the direction away from the defined bearing surface to form a convoluted tapered recess therealong, said recess having an inlet end and said bearing portion having a width substantially smaller than the width of said recess, and means for supplying lubricant to the inlet end of said recess whereby as the bearing rotates, a forward movement is imparted to the lubricant by the slightly conical surface portion moving thereagainst, the angle of said conical portion being so slight as to set up a resistance to flow along the area where the countersurface approaches the radially outer edge of the slightly conical surface portion, the said forward flow and resistance together building up pressure toward the edge of the bearing portion abutting said outer edge so as continuously to force the lubricant between said bearing portion and the constantly changing countersurface.

2. In a journal bearing adapted to be lubricated, a stationary part and a rotating part adapted to rotate at high speeds and having a bearing surface cooperating with a coaxial surface comprising a cylindrically defined helically convoluted effective bearing portion extending at least one full circumference of the rotating part, a slightly conical surface portion defining one edge of said bearing portion and decreasing in radius continuously in the direction away from the defined bearing surface to form a convoluted tapered recess therealong, said recess having an inlet end and said bearing portion having a width substantially smaller than the width of said recess and means for supplying lubricant to the inlet end of said recess under a pressure head whereby as the bearing rotates, a forward movement is imparted to the lubricant by the slightly conical surface portion moving thereagainst, the angle of said conical surface portion being so slight as to set up a substantial resistance to flow along the area where the countersurface approaches the radially outer edge of the slightly conical surface portion, the said forward flow and resistance building up pressure toward the edge of the bearing portion abutting said outer edge so as continuously to force the lubricant between the said bearing portions and the constantly changing countersurface.

3. In a journal bearing adapted to be lubricated, a stationary part and a rotating part adapted to rotate at high speeds and having a bearing surface cooperating with a coaxial countersurface on said stationary part, said rotating bearing surface comprising a pair of separate bearing portions and slightly conical surface portions each as described in claim 1, and each said bearing portion and slightly conical surface portion being convoluted in opposite directions from a point intermediate of the ends of the journal bearing, the recesses of said rotating bearing having their inlet ends at said point, and said means for supplying lubricant also being located at said point, whereby the lubricant is forced under pressure from the said point toward both ends of the journal bearing.

4. A journal bearing according to claim 1, and in which throttling means is provided towards the portion of the bearing toward which the lubricant discharges for increasing the pressure of the lubricant in the bearing.

ALFRED BUCHI.

REFERENCES CITED

The following references are of record in the file of this patent:

UNITED STATES PATENTS

| Number | Name | Date |
|---|---|---|
| 117,845 | Winnie | Aug. 8, 1871 |
| 1,377,866 | White | May 10, 1921 |
| 1,510,804 | Sherwood | Oct. 7, 1924 |
| 2,249,843 | Marsland | July 22, 1941 |

FOREIGN PATENTS

| Number | Country | Date |
|---|---|---|
| 197,369 | Switzerland | July 16, 1938 |